(12) United States Patent
Kunau

(10) Patent No.: US 10,800,215 B2
(45) Date of Patent: Oct. 13, 2020

(54) RECOIL REDUCING TIRE BEAD SEATER BARREL

(71) Applicant: Gaither Tool Company, Inc., Jacksonville, IL (US)

(72) Inventor: Daniel Kunau, Boone, CO (US)

( * ) Notice: Subject to any disclaimer, the term of this patent is extended or adjusted under 35 U.S.C. 154(b) by 0 days.

(21) Appl. No.: 14/882,422

(22) Filed: Oct. 13, 2015

(65) Prior Publication Data

US 2016/0101659 A1   Apr. 14, 2016

Related U.S. Application Data

(60) Provisional application No. 62/062,247, filed on Oct. 10, 2014.

(51) Int. Cl.
*B60C 25/14* (2006.01)

(52) U.S. Cl.
CPC .................................. *B60C 25/145* (2013.01)

(58) Field of Classification Search
CPC ....... B60C 25/145; B60C 25/00; B60C 25/12; B60C 25/14; B05B 1/005; F16L 25/00; B23P 17/00; B60S 5/043
See application file for complete search history.

(56) References Cited

U.S. PATENT DOCUMENTS

| | | | |
|---|---|---|---|
| 4,744,402 A * | 5/1988 | St-Hilaire | B60C 25/145 157/1.1 |
| 5,056,576 A * | 10/1991 | Iori | B60B 30/06 157/1.1 |
| 5,072,764 A | 12/1991 | Ochoa | |
| 5,168,911 A | 12/1992 | Gottschalk | |
| 5,456,302 A * | 10/1995 | Demers | B60C 25/145 157/1 |
| 5,509,456 A | 4/1996 | Bonko et al. | |
| 5,570,733 A * | 11/1996 | Desparois | B60C 25/145 157/1.1 |
| 5,878,801 A * | 3/1999 | Ellis | B60C 25/145 157/1.1 |
| 5,884,659 A | 3/1999 | Prosser et al. | |
| 6,179,033 B1 | 1/2001 | Demers | |
| 7,000,667 B2 | 2/2006 | Brahler, II | |
| 7,017,642 B2 | 3/2006 | Brahler, II | |
| 2003/0041901 A1 | 3/2003 | Gonzaga | |
| 2003/0178151 A1* | 9/2003 | Ritchie | B60C 25/145 157/1.17 |
| 2011/0247760 A1 | 10/2011 | White | |
| 2011/0253317 A1* | 10/2011 | Kunau | B60C 25/145 157/1.1 |

* cited by examiner

*Primary Examiner* — Robert J Scruggs
(74) *Attorney, Agent, or Firm* — QPatents

(57) ABSTRACT

A nozzle for seating a tubeless tire on a rim using pressurized gas includes a coupling neck configured to accept the pressurized gas from a pressurized tank, a choke point adapter connected to the coupling neck and a nozzle body configured with a nozzle output. Pressurized air introduced into the coupling neck pass through the nozzle and exits the nozzle output in a burst of the pressurized gas that is directed between the tubeless tire and the rim to inflate the tire. The choke point adapter has a chokepoint surface with a chokepoint angle of sufficient angle to aid in reducing the recoil of the tubeless tire seating device.

15 Claims, 3 Drawing Sheets

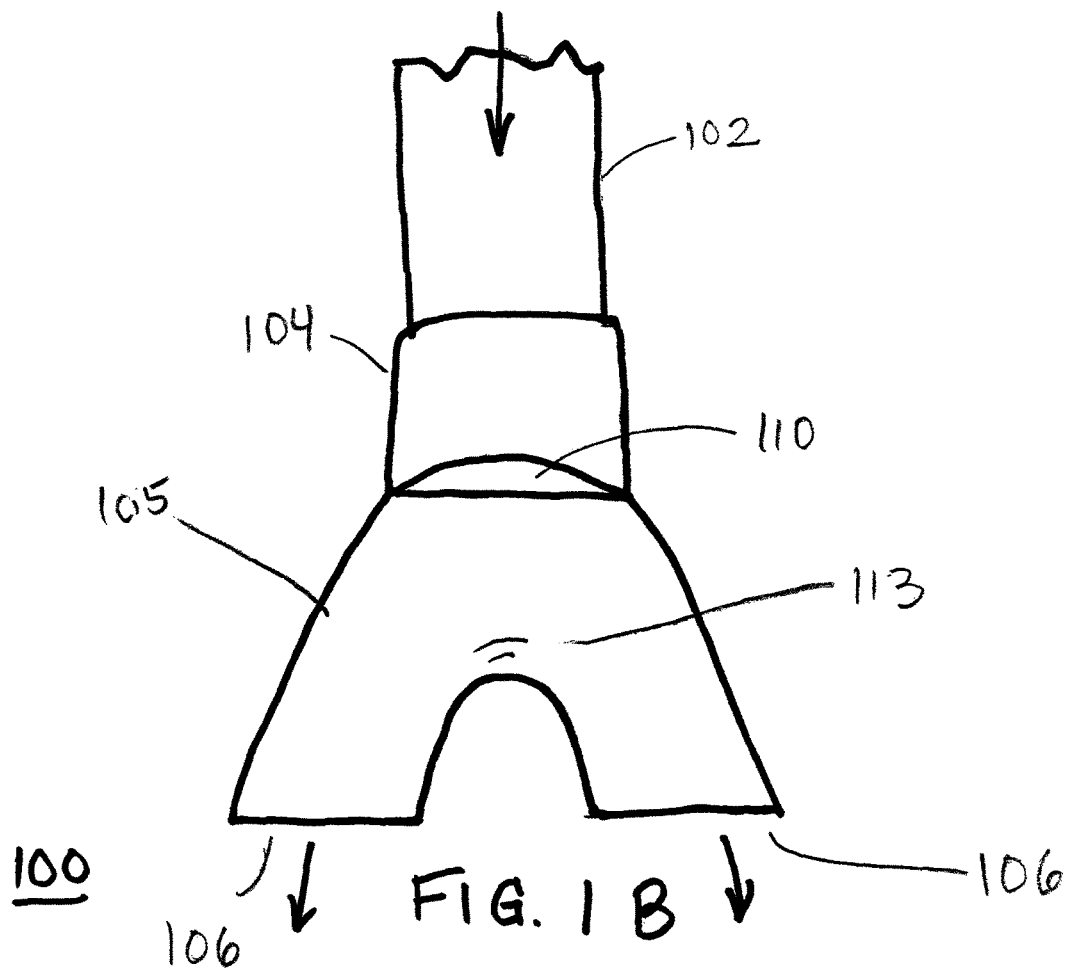
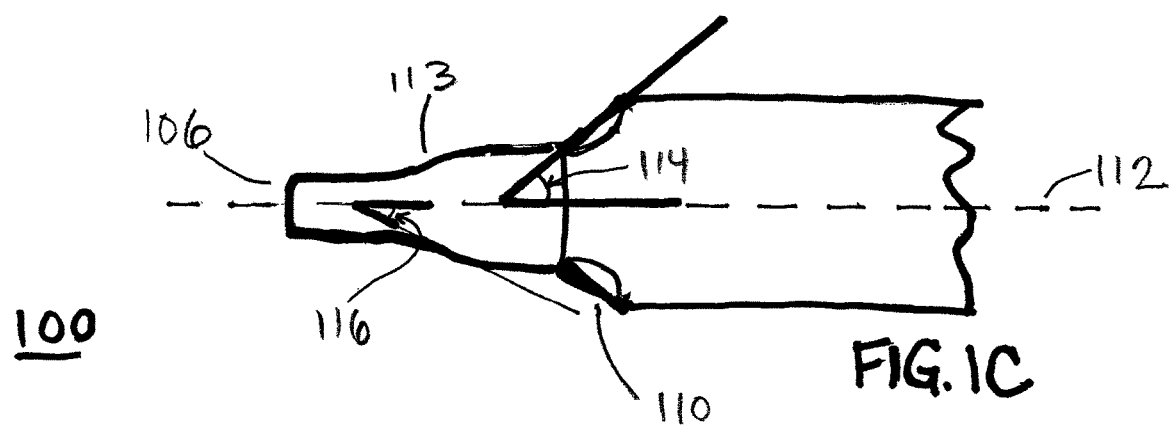

RECOIL REDUCING TIRE BEAD SEATER BARREL

CROSS-REFERENCE TO RELATED APPLICATIONS

This application claims the benefit of and priority to U.S. Provisional Application 62/062,247 filed Oct. 10, 2014 which is incorporated herein by reference in its entirety.

BACKGROUND

Technical Field

The present subject matter relates to tools. More specifically, the present subject matter relates to a tool for seating a tubeless tire on a rim configured to reduce the recoil due to the burst of air.

Description of Related Art

Many tires for automobiles, trucks and other equipment are designed to be mounted on wheels or rims without using a tube. The tire may be impervious to air with a bead around the inner edges of the tire designed to press against a lip of the rim to create an air-tight seal so that the combination of the tire and rim may be able to hold pressurized air or other gases suitable for inflating a tire. The rim may include a valve stem that may be used to inflate the tire.

After a tire is first mounted on a rim, the bead of the tire may not press tightly against the lip of the rim so that no air-tight cavity is created. In some cases, especially for smaller tires, enough air may be injected through the valve stem to create a pressure differential between the air inside the tire and the outside air so that, even though air may be escaping between the tire and the rim, the bead of the tire is pressed against the rim to create a seal. This may be referred to as seating the tire on the rim. Seating the tire on the rim allows the tire to be pressurized. But in some cases, especially with larger tires, it is just not possible to seat the tire by injecting air through the valve stem of the rim.

It is well known in the art that it may be possible to blow a high volume of air between the rim and the bead of the tire, creating the pressure differential between the pressure of the air in the tire and the outside air pressure, thereby seating the tire on the rim. Devices to accomplish this generally include a large, yet portable, pressurized air tank with a valve leading to a discharge barrel. The discharge barrel is typically a solid, leakproof metal tube rigidly connected to extend from the tank. The tank and discharge barrel may be positioned to blow a high volume of air from the pressurized air tank into the tire.

SUMMARY

Various embodiments are drawn to nozzles for seating a tubeless tire on a rim using pressurized gas includes an outlet and a jet configured to accept pressurized gas and emit a stream of gas through an orifice into a chamber in the nozzle. According to one embodiment a nozzle for seating a tubeless tire on a rim using pressurized gas has a coupling neck configured to accept the pressurized gas, a choke point adapter connected to and in gaseous communication with the coupling neck, and a nozzle body configured with a nozzle output. The coupling neck, the choke point adapter and the nozzle body are in gaseous communication such that the pressurized gas entering the coupling neck pass through the nozzle and exits the nozzle output in a burst of the pressurized gas directed between the tubeless tire and the rim. The choke point adapter is configured with a chokepoint surface having a chokepoint angle of at least 30 degrees.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. They should not, however, be taken to limit the invention to the specific embodiment(s) described, but are for explanation and understanding only. In the drawings:

FIGS. 1B-C depict a top view and a side view of the embodiment of a tire seating nozzle depicted in FIG. 1A.

DETAILED DESCRIPTION

The present inventor recognized a problem with conventional design. Namely, the conventional bead seater devices result in considerable kickback when the burst of air is fired between the tire and the rim, often making it difficult for a user to keep the conventional bead seater steady and maintain a grip on it. A burst of air is defined as air travelling at a high rate of speed, at least some of which is travelling at a speed of 100 miles per hour or more. The burst of air is controlled by a high speed valve that rapidly opens and closes to produce the burst. Typically, the volume of the burst of air is equal to at least slightly more than the volume of the inflated tire but no greater than three times the volume of the tire. (Some of the burst leaks out of the tire before the bead is seated.) The various embodiments disclosed herein aid in reducing the amount of kickback experienced when discharging a burst of air from the Bead Bazooka™ bead seater device equipped with the recoil reducing bead seater barrel.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

Mounting a tire refers to the act of placing a tire on a rim by sliding both beads of the tire over the rim so that the tire is on the rim with both beads between the two lips of the rim. Seating a tire refers to placing the beads of the tire against the lips of the rim, creating a seal and allowing the tire to be inflated to a desired pressure. For the purposes of this specification and claims, a tire is first mounted on the rim before the tire may be seated. With conventional devices it can be quite difficult to seat the tire on a rim so it can be inflated due to the gap between the tire and the rim once the tire has been mounted. Reference now is made in detail to the examples illustrated in the accompanying drawings and discussed below.

Figure 1A:
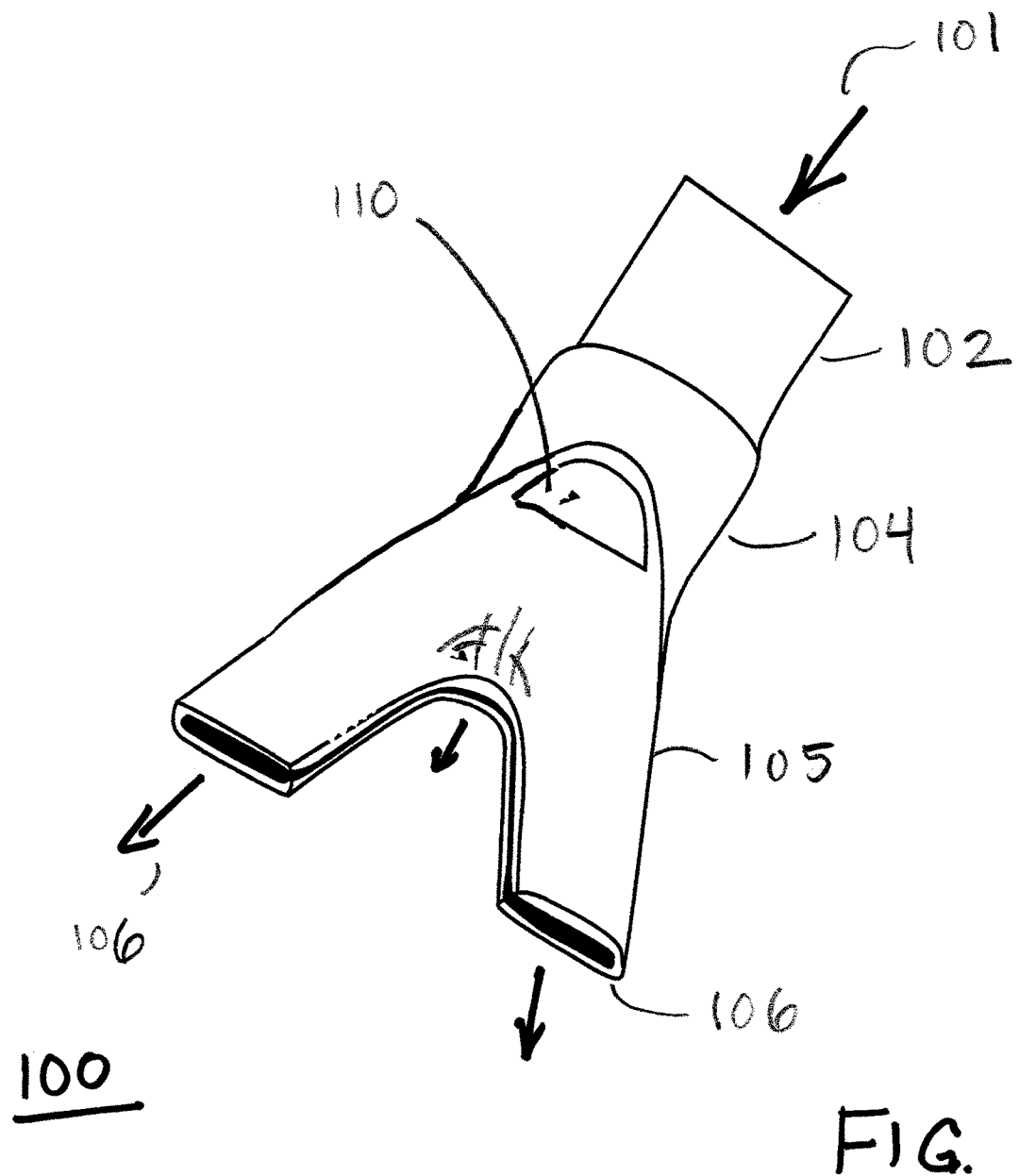
FIG. 1A depicts an isometric view of an embodiment of a tire seating nozzle configured to reduce recoil.

FIG. 1A depicts an isometric view of an embodiment of a tire seating nozzle. The nozzle 100 include a coupling neck 102, sometimes referred to as simply a coupling. The coupling neck 102 may be configured with mechanical means to connect to the nozzle 100 to a source of pressurized gas (not shown). For example, the coupling neck 102 may be configured with threaded so as to screw into the matching threads on a tank that holds pressurized gas. Other embodiments may use other types of connections to a source of pressurized gas including, but not limited to a quick-release coupling, a bayonet type coupling, welding to a pipe or tube, gluing to a pipe or tube, a compression fitting, or other such structures suitable for use as an attachment means.

The dimensions of the coupling neck 102 vary depending upon the size of the tires to be seated and the parameters of the implementation, e.g., the pressure of the pressurized air used to create a burst of air for seating the tire. However, the coupling neck 102 is typically at least one-half in in diameter up to four inches in diameter, with one and one-half inches to two inches being typical diameter values. The length of the coupling neck 102 may vary as well, but is typically between one-half inch to twenty inches, with one inch to four inches being a typical range for the length.

The coupling neck 102 depicted in FIGS. 1A-C is attached to a choke point adapter 104, which in turn, feeds into the nozzle body 105 and out the nozzle output 106. In some embodiments the nozzle body 105 is a separate part and is removably connected to the choke point adapter 104. In other embodiments, such as the embodiment depicted in FIGS. 1A-C, the nozzle body 105 is permanently connected to the choke point adapter 104 forming a nozzle 100 of once piece. The nozzle body 105 may be permanently connected to the choke point adapter 104 by welding, or by other means of connection such as matching male/female threads, gluing or friction fitting. The dimensions of the choke point adapter 104 and nozzle body 105 may vary depending upon the size of the tires to be seated and the parameters of the implementation. Typically, the diameter of the choke point adapter 104 is slightly greater than the diameter of the coupling neck 102—say one-eighth to one-half inch greater. The length of the choke point adapter 104 may vary as well, with a typical length falling within the range of one inch long to four inches long. The widest part of the nozzle body 105 is typically at the nozzle output 106, which in some instances may be as little as one and one-half inches wide to as great as twelve inches wide. A typical width of the widest point of the nozzle body 105 is from three inches to six inches. The length of the nozzle body 105 may vary as well, typically being from two inches long to as much eighteen inches long. For certain extreme applications—e.g., bead seaters for very large tires—the dimensions of these parts may vary beyond those described above.

The coupling neck 102, choke point adapter 104 and nozzle body 105 are in gaseous communication. The term "gaseous communication" means that air (or other gas) means that air entering one part passes through to the next part. Hence, the coupling neck 102, choke point adapter 104 and nozzle body 105 are in gaseous communication such that air entering at 101 passes through the nozzle 100 and exits the nozzle output 106 in a burst of air directed between a tire and a rim. In this way the tire is easily and conveniently inflated onto the rim. The bead seater nozzle 100 has two features that aid in reducing the recoil experienced by a user: the chokepoint angle 114 and the neckdown angle 116.

Firstly, as air passes through choke point adapter 104 it encounters a chokepoint surface 110, sometimes called a semi-vertical surface. In various embodiments the chokepoint surface 110 is angled by an amount within the range of 45+/−10 degrees from the center axis 112 running down the center of coupling neck 102. This angle is referred to as the chokepoint angle 114.

In some embodiments the chokepoint angle 114 may as little as 5 degrees, while in other embodiments the chokepoint angle may be greater than 90 degrees, e.g., 120 degrees. The chokepoint angle 114 may be any particular value or range within 5 degrees to 120 degrees. A chokepoint angle 114 greater than 90 degrees creates a pocket of air towards the end of the choke point adapter 104, cutting down on the efficiency of the bead seater nozzle 100. A chokepoint angle 114 as little as 5 degrees produces a slight reduction in recoil that is measurable, but may be difficult to detect by a user. A chokepoint angle 114 that is a value from 30 to 60 degrees produces a significant reduction in recoil felt by a user when a burst of air is fired through the bead seater nozzle 100.

A second feature of the bead seater nozzle 100 that aids in reducing recoil is the amount of the nozzle neckdown at the air division point 113, known as the nozzle neckdown angle 116. In some embodiments the nozzle neckdown angle 116 is less than the chokepoint angle 114. However, depending upon the characteristics and environment in which the bead seater nozzle 100 is to be used, the neckdown angle 116 may be as small as 2 degrees or as large as 90 degrees. The neckdown angle 116 may be any particular value or range within 2 degrees to 90 degrees. The neckdown angle 116, like the chokepoint angle 114, tends to inhibit air as it passes through, thus reducing the recoil of the bead seater nozzle 100 due to it rapidly firing a burst of air between a tire and a rim.

The embodiment depicted in FIGS. 1A-C is described above in terms of having a the chokepoint surface 110 with a chokepoint angle 114 and a portion of the nozzle body 105 with a neckdown angles 116. In implementation the nozzle 100 may be configure with a two chokepoint surfaces 110 and two neckdown angle 116—one on the top and one on the bottom. The two chokepoint surfaces 110 and two neckdown angles 116 may be symmetrical or may vary in the degree they are angled.

Figure 2A:
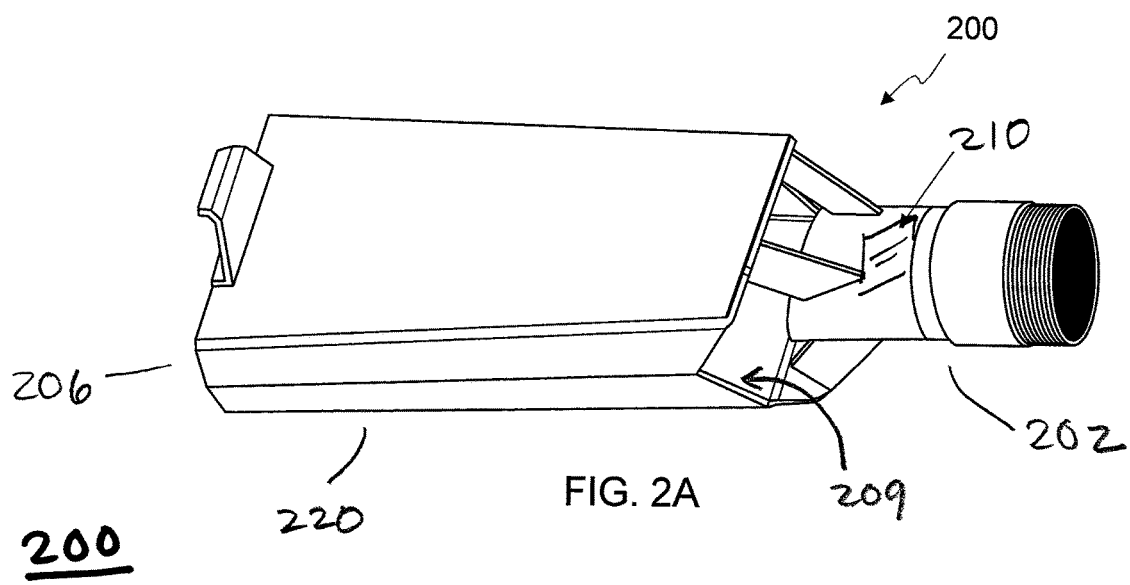
FIGS. 2A-B depict another embodiment of the bead seater nozzle configured to reduce recoil.
Figure 2B:
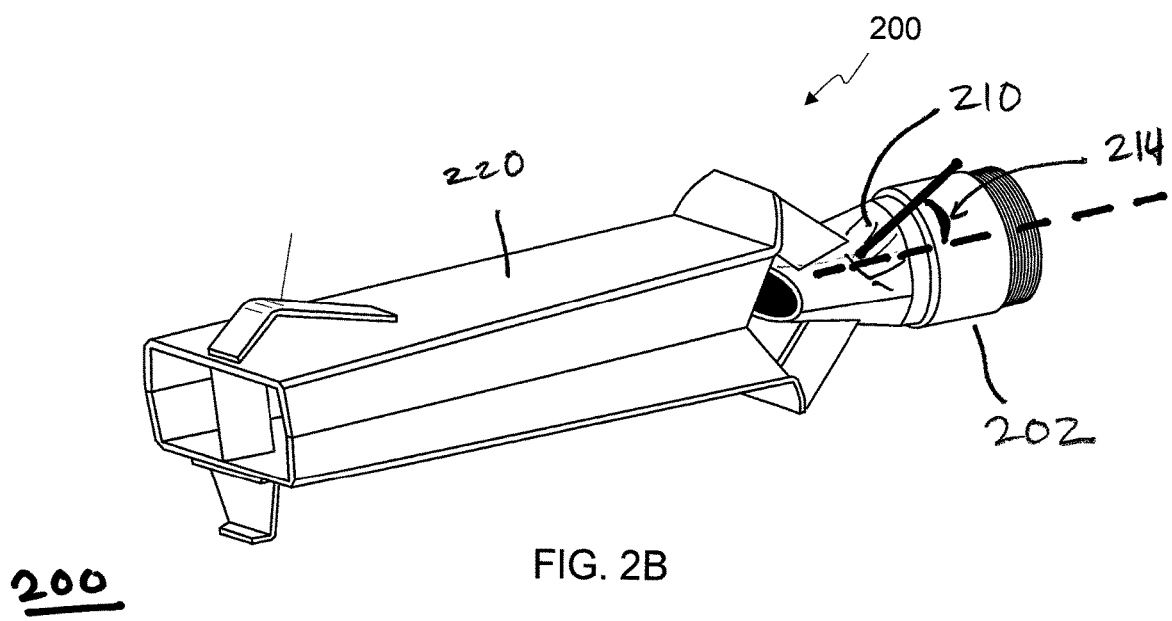

FIGS. 2A-B depict another embodiment of the bead seater nozzle configured to reduce recoil. FIG. 2A depicts an isometric view from a position behind and above the nozzle 200. FIG. 2B depicts an isometric view from a position in front of and below the nozzle 200. Like the embodiment 100, the embodiment 200 depicted in FIGS. 2A-B has a coupling neck 202. However, unlike the earlier embodiment the coupling neck 202 directs a stream of air into an air intake port 209 of nozzle body 220. This, in turn, cause air to be drawn into the air intake ports 209 of the nozzle 200 due to the Venturi effect. The gas from the storage tank, plus the air drawn into the air intake ports 209, is then blown out of the outlet 206 of the nozzle 200.

The embodiment depicted in FIGS. 2A-B has a pinched down portion referred to as a neckdown surface 210. This differs from earlier models that were designed with a slight tapering to as to reduce the friction of the air passing through the device. The angle at which the neckdown surface 210 is angled from the center axis is referred to as the chokepoint angle 214. In some embodiments the chokepoint angle 214 may as little as 5 degrees, while in other embodiments the chokepoint angle may as great as 90 degrees. Since the chokepoint angle 214 introduces perturbations in the air-stream it is preferable that the chokepoint angle not be greater than 90 degrees so as to provide a smooth transition into the nozzle body 220, thus increasing the air drawn into the intake ports 209.

The chokepoint angle 214 may be any particular value or range within 5 degrees to 90 degrees. A chokepoint angle 214 greater than 90 degrees would create pockets of air near the chokepoint surface 110, causing problems with the air being drawn into the air intake ports 209 of the nozzle 200, which in turn would result in lowering the efficiency of the bead seater nozzle 200. A chokepoint angle 214 as little as 5 degrees produces a slight reduction in recoil that is measurable, but, as discussed above, may be difficult to detect by a user. A chokepoint angle 214 that is a value from 30 to 60 degrees produces a significant reduction in recoil felt by a user when a burst of air is fired through the bead seater nozzle 200.

Various embodiments of tire seating nozzles may have a wide variety of different configurations of varying dimensions. Unless indicated to the contrary, the numerical parameters set forth in the preceding specification and attached claims are approximations that can vary depending upon the desired properties sought to be obtained by those skilled in the art utilizing the teachings of the present invention. As used in this specification and the appended claims, the singular forms "a", "an", and "the" include plural referents unless the content clearly dictates otherwise. Thus, for example, reference to an element described as "a port" may refer to a single port, two ports or any other number of ports. As used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. A nozzle rigidly connected to a portable, pressurized storage tank for seating a tubeless tire on a rim using a burst of pressurized gas that causes the storage tank to recoil, the nozzle comprising:
    a coupling neck configured to accept the pressurized gas;
    a choke point adapter connected to and in gaseous communication with the coupling neck; and
    a nozzle body configured with a nozzle output, wherein the coupling neck, the choke point adapter and the nozzle body are in gaseous communication such that the pressurized gas entering the coupling neck passes through the nozzle and exits the nozzle output in the burst of the pressurized gas that is directed between the tubeless tire and the rim of sufficient speed and volume to seat the tubeless tire on the rim;
    an air division point configured to divide the burst of the pressurized gas into two streams of air, wherein the nozzle body comprises a portion having a neckdown angle of at least 5 degrees at the air division point;
    wherein the choke point adapter comprises a chokepoint surface with a chokepoint angle of at least 30 degrees configured to aid in reducing the recoil of the storage tank.

2. The nozzle of claim 1, wherein the coupling neck is connected in an airtight manner to the choke point adapter.

3. The nozzle of claim 2, wherein the air division point has an amount of nozzle neckdown configured to aid in reducing the recoil of the storage tank.

4. The nozzle of claim 3, wherein the amount of nozzle neckdown is characterized by a nozzle neckdown angle which is less than the chokepoint angle.

5. The nozzle of claim 1, wherein the chokepoint angle is at least 35 degrees but no greater than 55 degrees.

6. The nozzle of claim 1, comprising:
    a first threaded portion on the coupling neck configured to mate with a second threaded portion on the storage tank;
    wherein the nozzle is air-tight from the first threaded portion to the air division point.

7. The nozzle of claim 6, wherein the chokepoint surface is a first chokepoint surface and the portion have a neckdown angle is a first portion having a first neckdown angle, the nozzle further comprising:
    a second chokepoint surface with a chokepoint angle of at least 30 degrees;
    a first portion of the nozzle body having a first neckdown angle of at least 5 degrees.

8. The nozzle of claim 7, wherein the first and second chokepoint angles are at least 35 degrees but no greater than 55 degrees.

9. The nozzle of claim 8, wherein the nozzle body comprises a portion having a neckdown angle of at least 10 degrees.

10. The nozzle of claim 1, wherein the chokepoint surface is a first chokepoint surface, the nozzle further comprising:
    a second chokepoint surface with a chokepoint angle of at least 30 degrees.

11. The nozzle of claim 1, wherein the coupling neck is no greater than three and one-half inches in diameter, the choke point adapter is no greater than four inches in length, and the nozzle body is no greater than ten inches in length.

12. The nozzle of claim 11, wherein the nozzle body is no greater than six inches wide at its widest part.

13. The nozzle of claim 12, wherein the coupling neck is at least one and three-quarters inches in diameter, the choke point adapter is at least one inch in length, and the nozzle body is at least than three inches in length.

14. The nozzle of claim 13, wherein the nozzle body is at least three inches wide at its widest part.

15. The nozzle of claim 13, wherein the chokepoint surface is a first chokepoint surface with a first chokepoint angle, the nozzle further comprising a second chokepoint surface with a second chokepoint angle of at least 30 degrees.

* * * * *